March 12, 1946.  A. G. DEAN  2,396,558
SPRING ARRANGEMENT FOR RAILWAY TRUCKS
Filed Sept. 15, 1943  2 Sheets-Sheet 1

INVENTOR.
Albert G. Dean
BY John P. Tarbox
ATTORNEY.

March 12, 1946. A. G. DEAN 2,396,558
SPRING ARRANGEMENT FOR RAILWAY TRUCKS
Filed Sept. 15, 1943 2 Sheets-Sheet 2
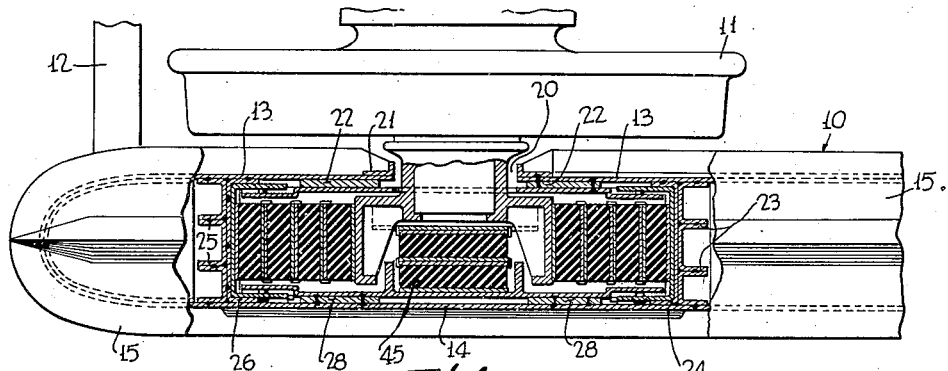
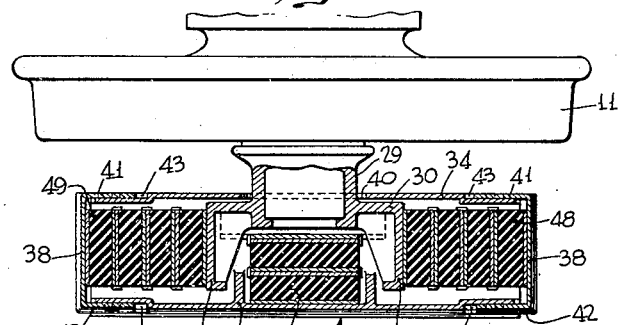
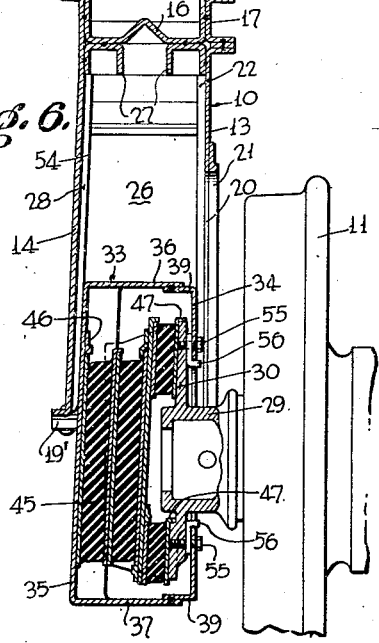
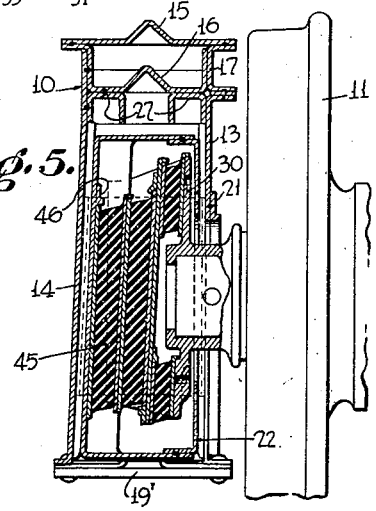
INVENTOR.
Albert G. Dean
BY John P. Tabot
ATTORNEY.

Patented Mar. 12, 1946

2,396,558

UNITED STATES PATENT OFFICE 2,396,558

SPRING ARRANGEMENT FOR RAILWAY TRUCKS

Albert G. Dean, Narberth, Pa., assignor to Edward G. Budd Manufacturing Company, Philadelphia, Pa., a corporation of Pennsylvania Application September 15, 1943, Serial No. 502,431

1 Claim. (Cl. 105—224.1)

The invention relates to improvements in spring arrangements for railway trucks and is especially adapted for rubber springs.

Among the objects of the invention is a spring arrangement between an axle box and a truck frame which is easy to install or to replace and which permits the easy removal with the axle whenever it is desired to change a wheel.

Another object of the invention is the protection of the rubber spring from the deleterious effects of oil, rain, dust, etc.

A still further object of the invention is simplicity of the construction of the spring and of adjoining parts connected to the spring.

The aforesaid objects and other advantages are mainly achieved by a housing for and constituting a unit with the spring or springs, which housing is slidable into a pocket formed by the longitudinal walls and transverse connections of a truck side frame.

The features and details of the invention as well as further objects and advantages will best be understood from the following description of an embodiment which is illustrated in the attached drawings.

In the drawings:

Fig. 3 is a partly sectional plan view of the corner of the frame with spring and wheel shown in Fig. 1;

Fig. 4 is a horizontal sectional view of the spring unit as shown in Fig. 3 but removed from the frame;

Figs. 5 and 6 are vertical sections through the frame and the spring in the positions shown respectively in Fig. 1 and Fig. 2.

Figure 1:
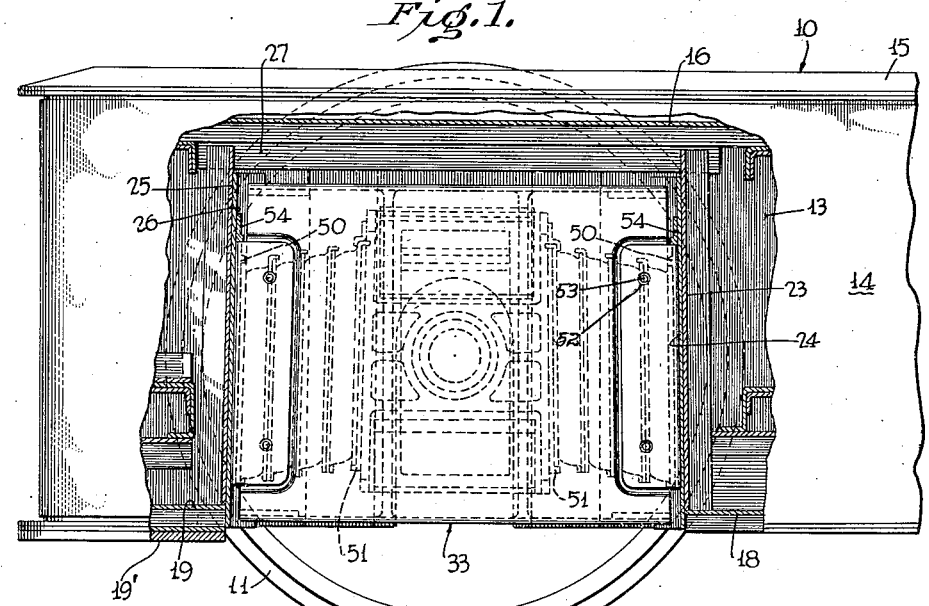
Fig. 1 is a fragmentary, partly sectional side elevation of one end of a truck frame with a spring and axle in place.
Figure 2:
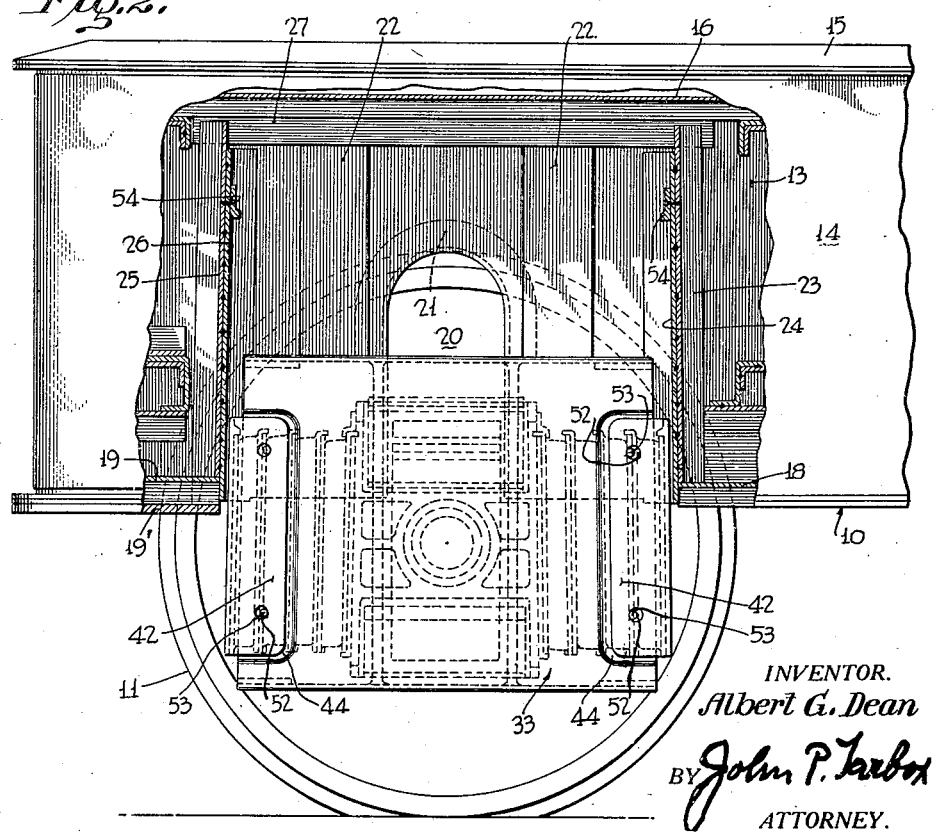
Fig. 2 is a view similar to Fig. 1 but spring and axle are shown partly withdrawn from the frame.

The truck frame and the spring shown in the drawings are of the general type disclosed in Patent 2,313,740, issued March 16, 1943, of R. Eksergian et al. on Truck construction.

10 is one of the side frames, 11 one of the wheels and 12 one of the cross members of the truck. The side frame has inner and outer side plates 13 and 14 respectively extending longitudinally in spaced parallel relation to one another and having their ends gradually curved toward and connected with one another. The side plates have their upper and lower margins interconnected by top members 15, 16, 17 and bottom members 18, 19, 19'. The inner plate 13 is provided with a vertical downwardly open slot 20 in the region of the wheel axis and is reinforced along the margins of the slot by rails or plates 21, 22.

The bottom members 18 and 19, 19' have their ends spaced from one another on both sides of the location of the wheel axis.

The side plates 13 and 14 are further interconnected by two sets of channel members 23, 24 and 25, 26, one set each being arranged on one of the sides of the wheel axis and at some distance therefrom. These sets of members diverge downwardly with respect to one another. The frame structure between the members 24 and 26 is reinforced by longitudinal channel members 27.

In the region between the members 23 and 25, the outer side wall 14 is outwardly and downwardly inclined similar to the inclination of said members, as clearly visible from Figures 3, 5 and 6. Opposite the members 22 of the inner plate, similar members 28 are attached to the outer plate 14. The members 22, 28 and the channel members 24, 26 form a guide and holding means for the spring unit as will be described later on.

The axle box 29 is provided near its outer end with a wide web 30 which has along its vertical side margins outwardly directed extensions 31, 32. The outer face of web 30 and the lateral outer faces of the extensions 31, 32 are inclined so that they extend about parallel to the respective members 14, 28, 24, 26 facing them.

The outer end of the axle box 29 with its web 30 and web extensions 31, 32 is enclosed in a housing 33 having an inner wall 34, an outer wall 35, top and bottom walls 36, 37 and lateral walls 38. The inner wall 34 has outwardly directed top and bottom flanges 39 serving for the connection with the inner margins of the top and bottom walls 36, 37 which latter are formed integrally with the outer wall 35. The inner wall 34 comprises a vertically elongated opening 40 through which the axle box 29 passes and in which it may move up and down. The lateral walls 38 have marginal flanges 41, 42 directed toward the transverse middle plane of the housing and fitting into recesses 43, 44 of the outer and inner walls.

One set 45 of rubber sandwiches with intervening and cover metal plates is inserted between the web 30 of the axle box and the outer wall 35 of the housing. A rib 46 on the wall 45 holds the spring in place whereas the upper edge of the inner cover plate engages by flange 47 the upper edge of the web 30.

Two further sets of rubber sandwiches 48, 49 are arranged between the axle box web extensions 31, 32 and the walls 38 of the housing 33. The movement of these sandwiches is limited by ledges 50 and 51 formed respectively on the walls 38 and the extensions 31, 32.

So as to allow the easy assembly and disassembly of the spring unit, the arms 41, 42 of the lateral walls 38 are each provided with two holes 52 adapted to register with pins 53 projecting outwardly from the walls 34, 35. For assembling the spring unit, at first the axle box and the spring 45 are inserted, then the springs 48, 49 are put in place, and finally the end plates 38 are pressed against the springs while forcing the lateral margins of the walls 34, 35 toward each other (see Fig. 3). When the pins 53 register with the holes 52 the walls are released and the engagement between the walls 34, 38, 35 is effected. The disassembly is carried out in reversing the described procedure.

The completely assembled spring unit is slid from the bottom into the interior of the frame. The walls 38 of the unit are engaged by the tapering members 24, 26 of the frame and are slightly pushed toward each other as visible from the location of the pins 53 relative to the holes 52 in Fig. 1. The exact location of the spring unit is determined by the projecting members 54 secured to the members 24, 26.

The side walls 34, 35 of the spring unit are engaged by the members 22, 28 attached to the walls 13, 14 of the frame. During the assembly or disassembly of spring unit and frame, the axle box 29 and the spring housing may temporarily be secured together by screw bolts 55 and clips 56 shown in Fig. 6.

The truck frame 10, 12 and the spring housing consist preferably of high-strength sheet metal such as stainless steel, the components being spot welded together except where other connecting means are indicated in the drawings and/or described hereinbefore.

The invention is not limited to the illustrated and described embodiment but is liable to many modifications so as to adapt it to specific conditions, different forms of springs, different types of frames and so so. All such modifications are intended to be covered by the attached claim.

What is claimed is:

In a railway car truck, a side frame having spaced vertical, longitudinal walls; a slot in one of said walls extending from the bottom margin upwardly; the other wall being inclined upwardly toward the first wall; transverse connections between said walls on both sides of said slot; a housing nested removably in the pocket formed by said walls and transverse connections; said housing having a slot registering at least partly with said first named slot; an axle box extending through said slots; springs inserted between the axle box and said housing in the interior of the latter.

ALBERT G. DEAN.